United States Patent

Mizukami

[11] Patent Number: 5,818,962
[45] Date of Patent: Oct. 6, 1998

[54] COORDINATE TRANSFORMATION METHOD FOR BINARY IMAGE

[75] Inventor: Satoshi Mizukami, Tokyo, Japan

[73] Assignee: Mitsubishi Denki Kabushiki Kaisha, Tokyo, Japan

[21] Appl. No.: 618,868

[22] Filed: Mar. 20, 1996

[30] Foreign Application Priority Data

Apr. 21, 1995 [JP] Japan .................................. 7-097245

[51] Int. Cl.[6] ........................................................ G06K 9/34
[52] U.S. Cl. ............................ 382/180; 382/293; 382/296
[58] Field of Search .................... 382/180, 293, 382/295, 296, 297, 298, 301; 395/136, 137, 138, 139; 348/580, 581, 582, 583; 364/731; 345/121

[56] References Cited

U.S. PATENT DOCUMENTS 4,783,829   11/1988   Miyakawa et al. ..................... 382/199

FOREIGN PATENT DOCUMENTS

4-98371   3/1992   Japan .
4-239980  8/1992   Japan .

*Primary Examiner*—Phuoc Tran
*Attorney, Agent, or Firm*—Wolf, Greenfield & Sacks, P.C.

[57] ABSTRACT

A binary image coordinate transformation method can simplify the transformation processing for those portions consisting of pixels having the same single color value, thereby increasing the processing speed of binary image transformation overall. The original image is divided into a plurality of sub-regions. For each sub-region, it is detected whether or not the sub-region consists of pixels having the same color value of two color values of a binary image. The post-transformed image is divided into a plurality of sub-blocks. For each sub-block, all the sub-regions containing pixels corresponding to those pixels included in a sub-block are detected. When it is determined that the all the detected sub-regions corresponding to the sub-block have the same color value, the sub-block of the post-transformed image is covered with that single color in one go.

8 Claims, 8 Drawing Sheets

COORDINATE TRANSFORMATION METHOD FOR BINARY IMAGE

BACKGROUND OF THE INVENTION

1. Field of the Invention

This invention relates to an improved method for coordinate transformation of a binary image, such as enlargement, reduction, or rotation of image data displayed as a binary image.

2. Description of the Related Art

Binary image display is one of the most basic techniques of image display, where black dots are displayed at desired locations on a white background. Geometrical transformation of a binary image, such as enlargement, reduction or rotation of the image, is generally carried out by calculating a pixel location (x, y) of the original (pre-transformed) image corresponding to the pixel (X, Y) of the post-transformed image, and assigning the color value of the pixel (x, y) of the original image to the post-transformed pixel (X, Y).

Figure 1:
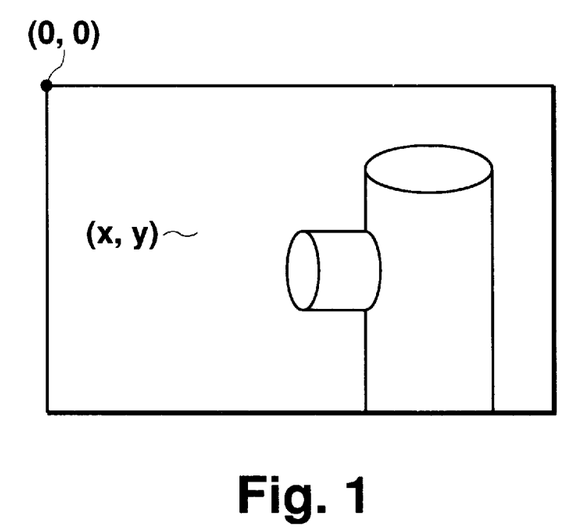
FIG. 1 illustrates an example of a pre-transformed binary image.
Figure 2:
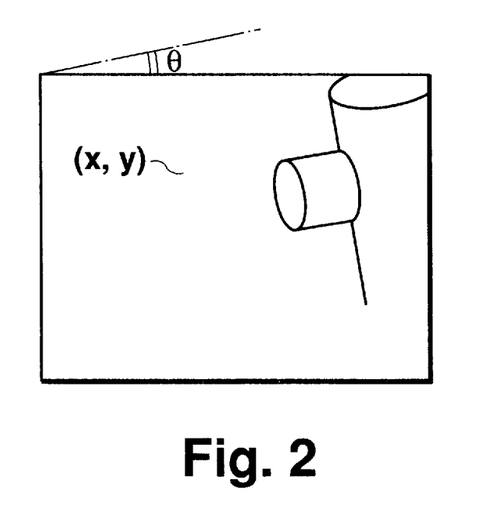
FIG. 2 illustrates a post-transformed image which is obtained by rotating and enlarging the binary image of FIG. 1.
Figure 3:
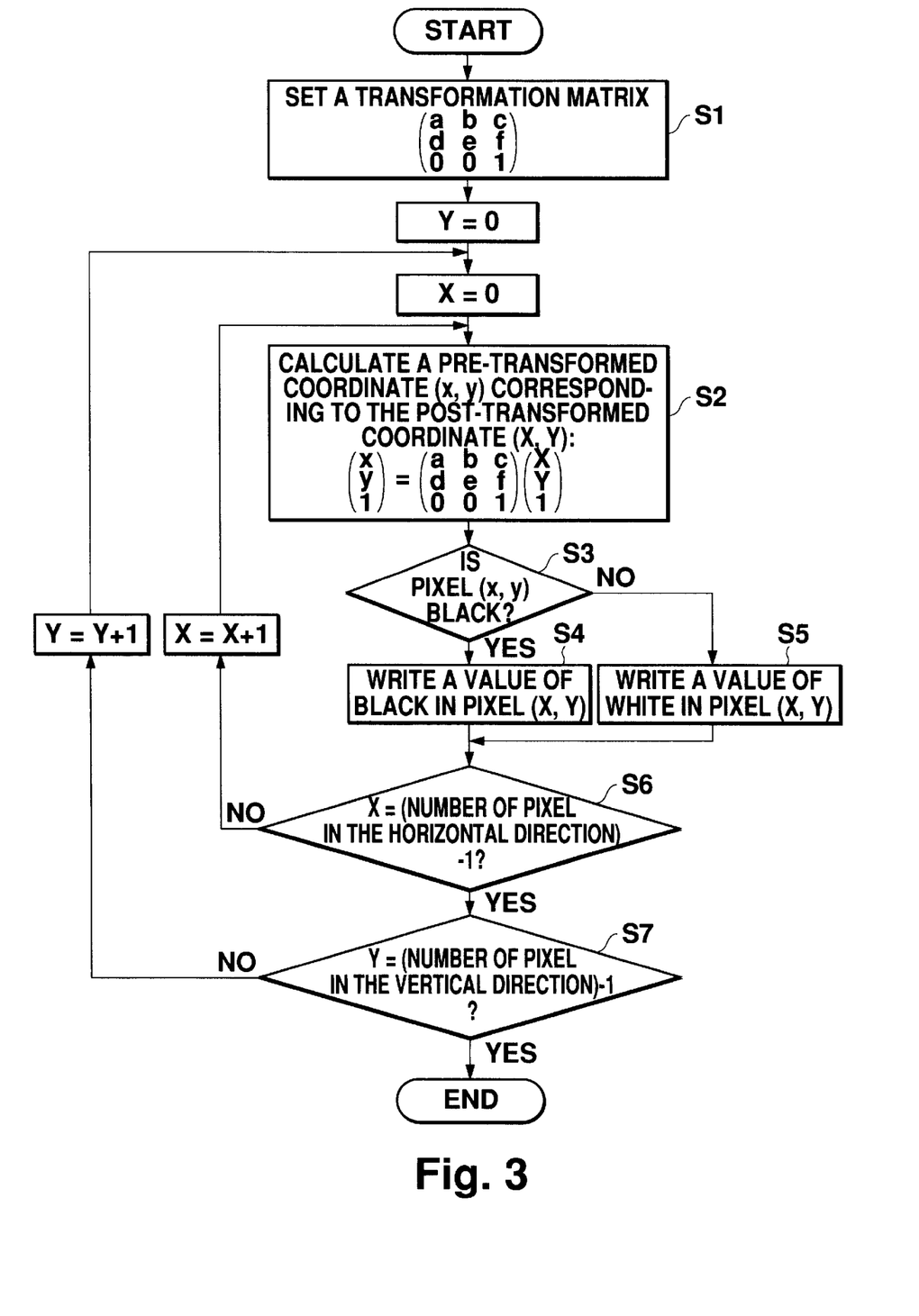
FIG. 3 is a flow chart showing the conventional coordinate transformation processes for binary image.

Giving an example of rotating an image shown in FIG. 1 by θ degrees with respect to the point (0, 0) (top left corner), and enlarging it by E times to obtain a new image shown in FIG. 2, the conventional transformation processes are shown in FIG. 3. As a first step, a 3×3 transformation matrix shown below is set (S1).

$$M = \begin{pmatrix} a & b & c \\ d & e & f \\ 0 & 0 & 1 \end{pmatrix} \quad (1)$$

where a=cos(-θ)/E, b=-sin(-θ)/E, c=f=0, d=sin(-θ)/E, e=cos(-θ)/E. By varying the values of "a" to "f", rotation, enlargement, reduction, translation, or distortion of the original binary image can be achieved. The pixel location values X and Y are initialized to zero (X=0, Y=0), and the original (pre-transformed) pixel (x, y) corresponding to the post-transformed pixel (X, Y) is calculated using the transformation matrix set in the first step (S2). The color value of the calculated pixel (x, y) is determined between two values of the binary image, for example, black or white (S3). In the case that the pixel (x, y) is out of the pre-transformed image frame, it is determined as white. The obtained color value of the original pixel (x, y) is written in (or assigned to) the post-transformed pixel (X, Y) (Steps 4 and 5). These steps are successively repeated in the x-axis (horizontal) direction and y-axis (vertical) direction to complete writing of color values for all pixels (X, Y) of the post-transformed image (Steps 6 and 7).

In the above-mentioned technique, matrix transformation must always be carried out for all of the pixels contained in the post-transformed image even if the majority of the original image is blank (white). In other words, the processes shown in FIG. 3 must be performed for every pixel, even for the blank portion having no change between before and after enlargement or rotation of the binary image. In order to increase the processing speed of binary image transformation, it is desirable to obviate unnecessary processing taken for such a blank portion.

SUMMARY OF THE INVENTION

This invention was conceived in view of the problem, and it is an object of the invention to provide an improved method for binary image coordinate transformation, which simplifies transformation processing for a portion consisting of pixels defined by the same single value, thereby increasing the efficiency of image transformation.

In order to achieve this object, the binary image coordinate transformation method in accordance with the invention comprises the steps of dividing the original (pre-transformed) binary image into a plurality of sub-regions, determining for each sub-region whether or not the sub-region consists of pixels defined by the same single color value (i.e. one of the two values), labelling each sub-region with a value indicating the color state of the sub-region based on the detection result, storing the labeling values, dividing the post-transformed binary image into a plurality of sub-blocks, detecting, for each sub-block, all sub-regions associated with the sub-block, detecting whether or not pixels contained in all the detected sub-regions associated with the sub-block have the same value, and covering the entire sub-block with a single color when it is detected that all of the detected sub-regions have the same label values indicating that pixels contained in the sub-regions associated with the sub-block have the same color value.

When it is detected that all sub-regions corresponding to a sub-block of the post-transformed image consist of pixels defined by a single color value, the entire area of the sub-block is covered with that single color in one go. Thus, pixel-to-pixel coordinate transformation processing can be obviated for those areas having no change between before and after the binary image transformation, resulting in a shortened processing time.

The most suitable number of sub-blocks in the post-transformed image is determined based on the ratio of the two colors occupying the original image to optimize the processing speed of transformation.

The method may further comprise the steps of transforming the vertexes of each sub-block into the original image to form a temporary region defined by the four transformed coordinates, and detecting all sub-regions containing pixels corresponding to those pixels included in the sub-block of the post-transformed image.

When the temporary region is rotated with respect to the sub-region of the original image, the sub-regions located on the outline of the temporary region are first detected, based on which all sub-regions which contain the pixels corresponding to the post-transformed pixels included in the sub-block are detected.

When the temporary region is not rotated with respect to the sub-region of the original image, all sub-regions which contain pixels corresponding to the post-transformed pixels included in the sub-block are directly detected based on the vertex coordinates of the temporary region.

Depending on the presence or absence of rotational transformation, image transformation processing is branched, which improves the processing efficiency.

DETAILED DESCRIPTION OF THE PREFERRED EMBODIMENT

Figure 4:
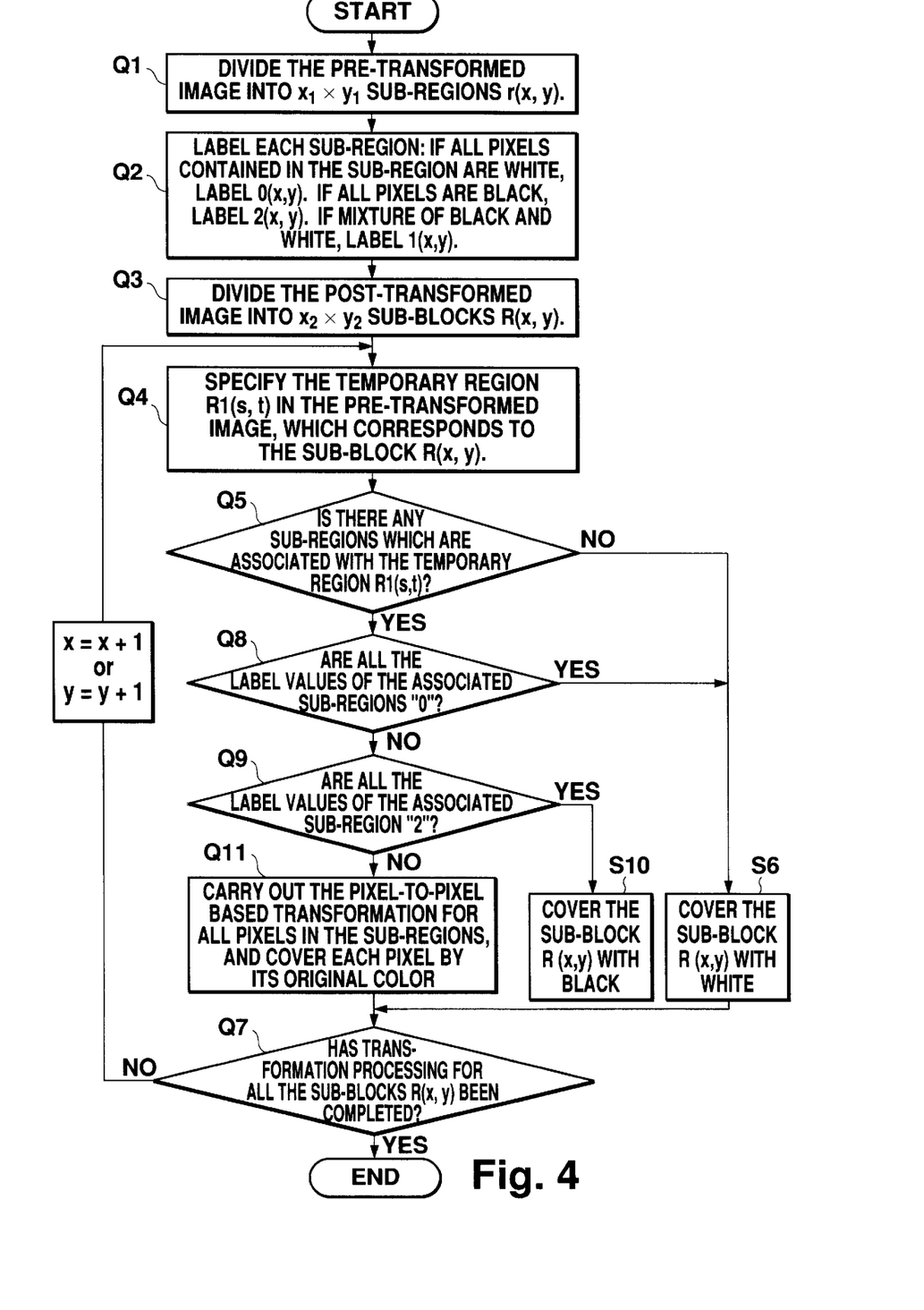
FIG. 4 is a flow chart showing the binary image coordinate transformation processes in accordance with the present invention.

The binary image coordinate transformation method in accordance with the invention will be described with reference to FIG. 4.

Figure 5:
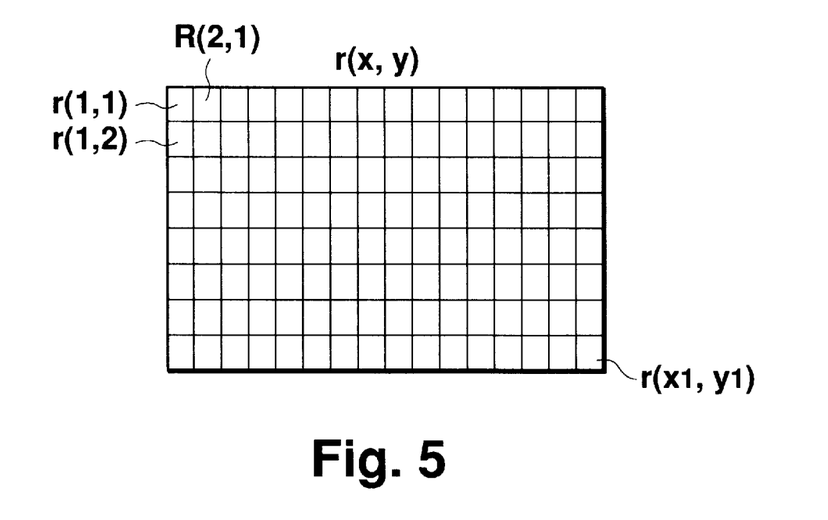
FIG. 5 illustrates a plurality of sub-regions obtained by dividing the pre-transformed image.

The original (pre-transformed) binary image, which is drawn with black color on the white background, is divided into $x_1 \times y_1$ sub-regions r(x, y), as is show in step Q1 and FIG. 5. Each sub-region is preferably formed as a square. Assuming that a computer processes 32 bit data as a unit, it is referable that the sub-region r(x, y) contains $32n \times 32n$ dots of pixels (n=1, 2, 3 . . . ).

Figure 6:
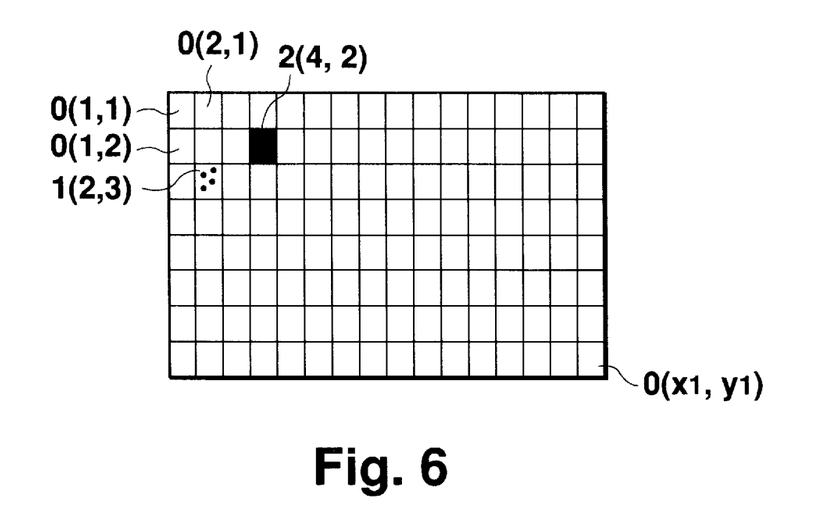
FIG. 6 illustrates the sub-regions of FIG. 5, each of which is labeled with a value indicating the color state.
Figure 7:
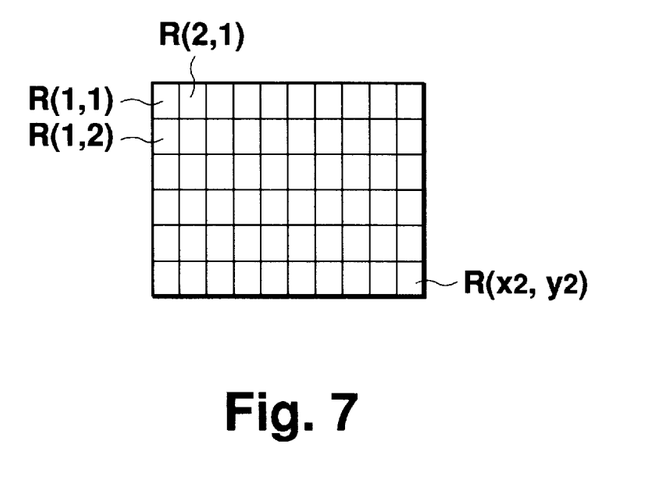
FIG. 7 illustrates a plurality of sub-blocks obtained by dividing the post-transformed image.

It is detected, for every sub-region, whether or not all the pixels contained in the sub-region have the same single color value (Q2). When all the pixels included in the sub-region r(x, y) is white, the sub-region is labeled as 0(x, y), when those pixels included in the sub-region are all black, it is labeled as 2(x, y). If the sub-region r(x, y) includes both black and white, it is labeled as 1(x, y) FIG. 6 shows an example of labeled sub-regions.

Then, the post-transformed binary image is divided into $x_2 \times y_2$ sub-blocks R(x, y) (step Q3). Similarly to the sub-region r(x, y), the number of pixels included in a sub-block is preferably a square of n times a bit number processed by the computer (n is a natural number). It is not necessary to divide the post-transformed image into the same size or the same number of squares as the sub-regions of the pre-transformed image.

A temporary region R1(s, t), which corresponds to a sub-block R(x, y) in the post-transformed image, is detected in the pre-transformed image (Q4). This is achieved by transforming four vertexes with coordinates (X1, Y1), (X2, Y1), (X1, Y2) and (X2, Y2) of the sub-block into the original image, using the transformation matrix (1), and obtaining the corresponding four vertexes R1(s1, t1), R1(s2, t2), R1(s3, t3), and R1(s4, t4). The region defined by these vertexes R1(s1, t1), R1(s2, t2), R1(s3, t3), and R1(s4, t4) is a temporary region.

In step Q5, all the sub-regions r(x, y) which contains at least one pixel in common with the temporary region are detected. Thus, all the sub-regions, which contain pixels corresponding to the post-transformed pixels included in the sub-block R(x, y), are detected. In the case that no sub-regions r(x, y) associated with the temporary region R1(s, t) is detected, this means that the temporary region R1(s, t) is located out of the frame of the pre-transformed image. In such a case, the operation proceeds to step Q6, and all the pixels contained in that sub-block R(x, y) are covered with white. The operation further proceeds to step Q7, where it is detected whether or not coordinate transformation for all of the sub-blocks has been completed. If YES, the transformation processing is finished. If NO, the operation returns to the step Q4 to carry out further coordinate transformation for another sub-block R(x, y).

Upon detecting all the sub-regions r(x, y) having at least one pixel in common with the temporary region R1 (s, t) in Q5, it is detected whether or not all the sub-regions r(x, y) associated with the temporary region R1(s, t) are labeled with a value "0" (step Q8). If YES, the operation advances to step Q6 to cover all the pixels in the sub-block R(x, y) with white in one go. Checking the label values of a plurality of sub-regions associated with the temporary region is successively carried out through the first to last sub-regions. In the case that the first sub-region is labeled with "0" but some others are not labeled with "0", the operation may skip to step Q11 upon detection of different label values. Details of the step Q11 will be described below.

If the label value of the First sub-region is not "0", the operation advances to step Q9 to detect whether or not all the sub-regions r(x, y) associated with the temporary region are labeled with "2". If the label value of the all sub-regions is "2", the operation advances to step Q10, and all the pixels contained in the sub-block R(x, y) are covered with black in one go. If all the sub-regions are not labeled with "2", the operation advances to step Q11 upon detection of different label values.

Through the operations Q8 to Q6 and operations Q9 to Q10, those sub-blocks defined by a single color value are detected, and entire area of such sub-blocks is covered with that single color (white or black) in one go.

In the case that the label value of the first sub-region which is associated with the temporary region is "1", or in the case that the label values of the sub-regions are a mixture of "0", "1", or "2", the operation advances to step Q11 and coordinate transformation is carried out for each pixel contained in the sub-block R(x, y) using the conventional matrix transformation technique shown in FIG. 3. Namely, the color value of each pixel of the original image is specified, and assigned to the corresponding pixel of the post-transformed image on a pixel-to-pixel basis.

These operations are repeated until processing for all sub-blocks R(x, y) of the post-transformed is completed.

By dividing the original image into sub-regions and labeling them with specific values defined by color values of pixels contained therein, those areas defined by a single color value can be detected in the post-transformed image and are covered with that single color (i.e. either of the two color values of the binary image) without pixel-to-pixel based matrix transformation, resulting in a shortened processing time for the binary image.

The amount of time saving will now be described.

The post-transformed image is divided into a plurality of sub-blocks, each of which has B×B dots (i.e. $B^2$ pixels). When carrying out pixel coordinate transformation for each sub-block using the transformation matrix (1), the number of pixels contained in a sub-region of the pre-transformed image is expressed, using the components of the transformation matrix, as $$B^2|ae-bd| \quad (2)$$

Assuming that the ratio of the white pixels to all of the pixels of the pre-transformed image is "p", the probability that all pixels contained in a sub-region of the pre-transformed image are white is expressed as below.

$$P_{white}=p^{B^2}|ae-bd| \quad (3)$$

The probability that all pixels in a sub-region are black is as follows.

$$P_{black}=(1-p)^{B^2}|ae-bd| \quad (4)$$

Assuming that the number of pixels in the horizontal direction of the post-transformed image is M, and the number of pixels in the vertical direction is N, the total number of sub-blocks of the post-transformed image is represented as $(MN)/B^2$.

The time saving effected by the batch processing for all pixels having the same color value in the sub-region, compared to the pixel-to-pixel based matrix transformation, is calculated by the following processes.

First, the reduced time "t" by batch transformation for every sub-block is expressed as follows.

t=(calculation time per pixel)×(probability that all pixels in a sub-region are black or white)×(the number of sub-blocks in the post-transformed image)×(the number of pixels contained in a sub-block of the post-transformed image)

Assuming that the calculation time per pixel (i.e. time required for detecting a color value of a pixel using the conventional technique) is $C_1$, the above expression is represented as follows.

$$t = C_1\{p^{B^2}|ae-bd|+(1p)^{B^2}|ae-bd|\}(NM/B^2)B^2 = C_1\{p^{B^2}|ae-bd|+(1-p)^{B^2}|ae-bd|\}NM \quad (5)$$

On the other hand, the time taken for calculating vertex pixels of the temporary region in the original image (which corresponding to the vertexes of sub-blocks in the post-transformed) is expressed as (coordinate transformation time per pixel)×(number of vertexes of all sub-block of the post-transformed image).

Assuming that the time required for coordinate transformation for a pixel using the matrix is $C_2$, the above-mentioned time is represented as:

$$C_2(M/B+1)(N/B+1) \quad (6)$$

The total calculation time for detecting label values of all sub-regions of the original image is (time required for detecting a label per sub-region)×(total number of labels). In other words, (time required for detecting a label per sub-region)×(number of sub-regions associated with a sub-block of the post-transformed image)×(number of sub-blocks included in the post-transformed image).

Assuming that the time required for detecting the label value of a sub-region is $C_3$, the above expression is rewrite as:

$$C_3 \times |ae-bd| \times MN/B^2 \quad (7)$$

Taking the above expressions (5), (6) and (7) into account, the actual shortened time is represented as follows.

$$C_1\{p^{B^2}|ae-bd|+(1-p)^{B^2}|ae-bd|\}NM - C_2(M/B+1) - C_3|ae-bd|MN/B^2 \quad (8)$$

The constants $C_1$, $C_2$, and $C_3$ vary depending on the type of computer and programs used for this processing, and are determined by measuring the calculation time after creation of the program. It is preferable to determine the best value for the dot number B by successively incorporating a value of $32n$ (n : natural number) so as to render the shortened time represented by the above expression (8) maximum. This means that the optimum value B is obtained based on the ratio of two color values (i.e. ratio "p" of white to the whole). The number of sub-blocks of the post-transformed image, which is determined based on the value B, is also determined on the basis of the ratio "p".

Detection of sub-regions associated with the temporary region R1(s, t), which has been mentioned in relation to step Q5, will now be described in more detail.

Sub-regions in association with the temporary region can be detected by either the first or second technique. However, when the rotational angle of the temporary region R1(s, t) with respect to the sub-region is "0" (i.e. the matrix components b=0, d=0), the first technique is preferable. On the contrary, when the rotational angle of the temporary region is not zero (i.e. b≠0, d≠0), the second technique is preferable. Both techniques will be described with reference to FIGS. 8, 9 and 10, taking a case where the rotational angle is not zero as an example.

Figure 8:
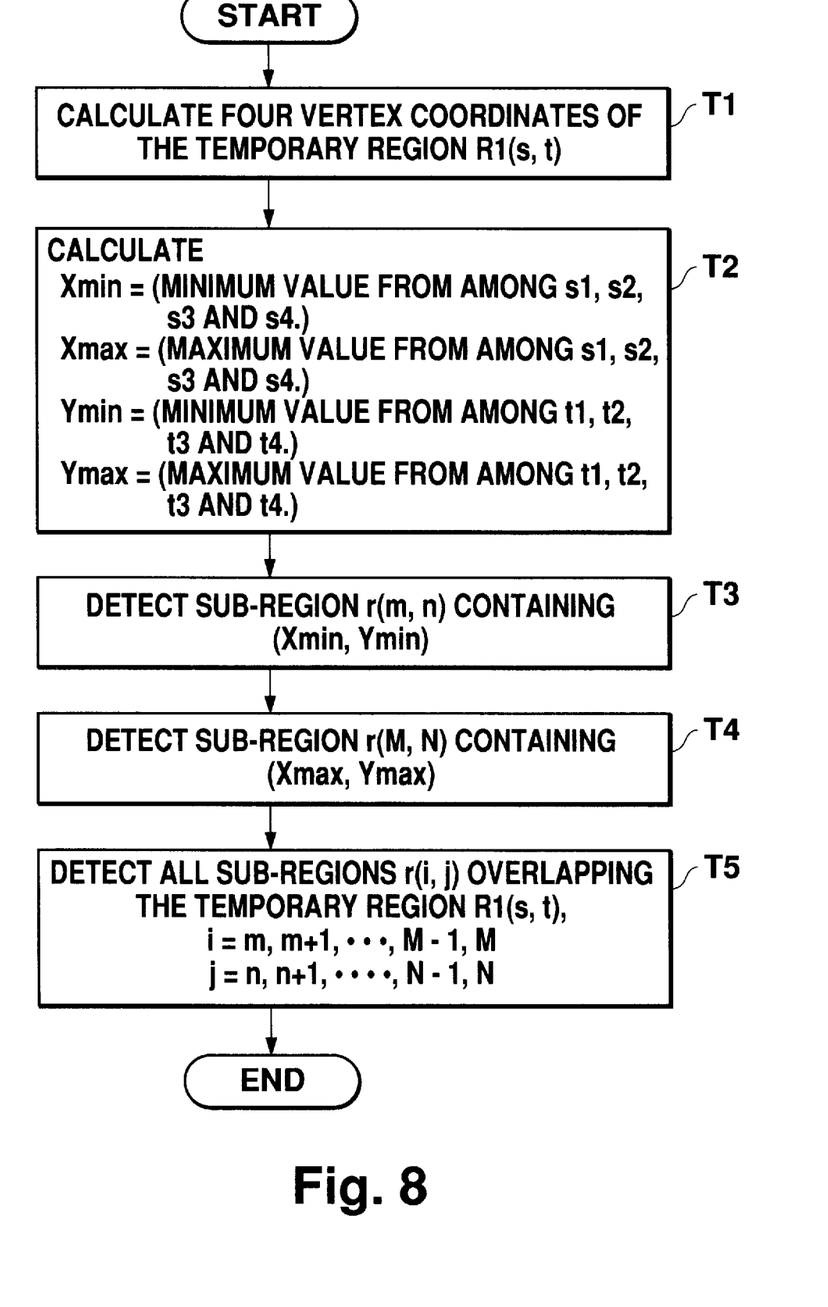
FIG. 8 is a flow chart showing a first technique for detecting sub-regions associating with a temporary region.
Figure 9:
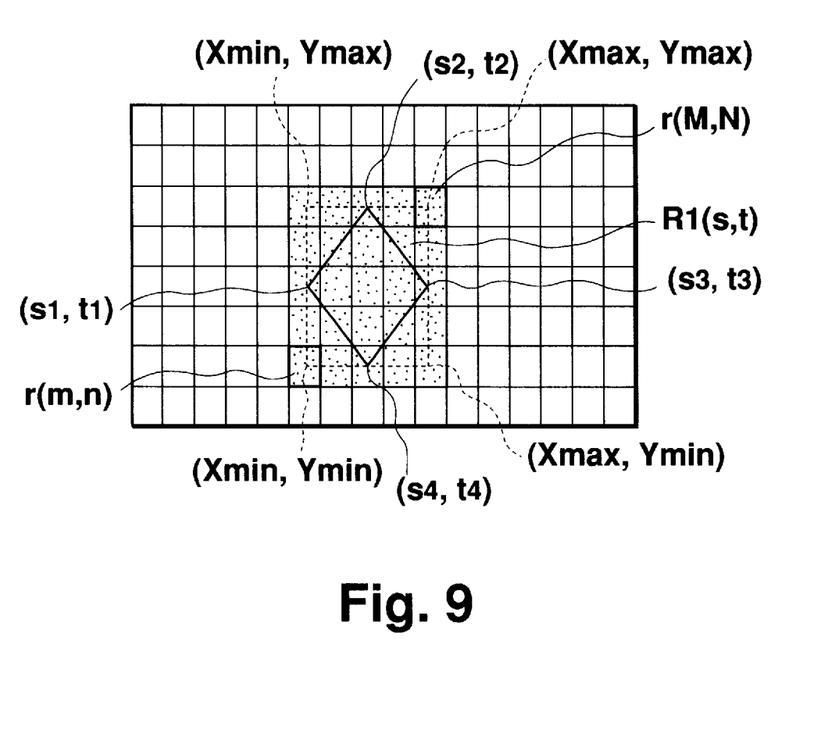
FIG. 9 shows an example of a temporary region assigned onto the pre-transformed image.

In the first technique (See. FIG. 8 and 9), the four vertexes R1(s1, t1), R1(s2, t2), R1(s3, t3) and R1(s4, t4) of the temporary region R1(s, t) are detected (step T1), and the rectangular region defined by four points $(X_{max}, Y_{max})$, $(X_{min}, Y_{max})$, $(X_{min}, Y_{min})$, $(X_{max}, Y_{min})$, which completely encloses the temporary region R1(s, t), is formed by selecting the maximum and minimum values for X and Y coordinates from among s1–s4 and t1–t4 (step T2).

Then, the sub-region r(m, n) which contains the point $(X_{min}, Y_{min})$ is detected (step T3). The location of the sub-region r(m, n) is detected by dividing the X coordinate and Y coordinate by the number of dots consisting the one side of the sub-region and adding 1 to the integer of the quotient. Another sub-region r(M, N) containing the diagonal point $(X_{max}, Y_{max})$ is detected (step T4). All the sub-regions r(i, j) satisfying the conditions of m≦i≦M and n≦j≦N will be those overlapping the temporary region R2(s, t) (step T5).

Figure 10:
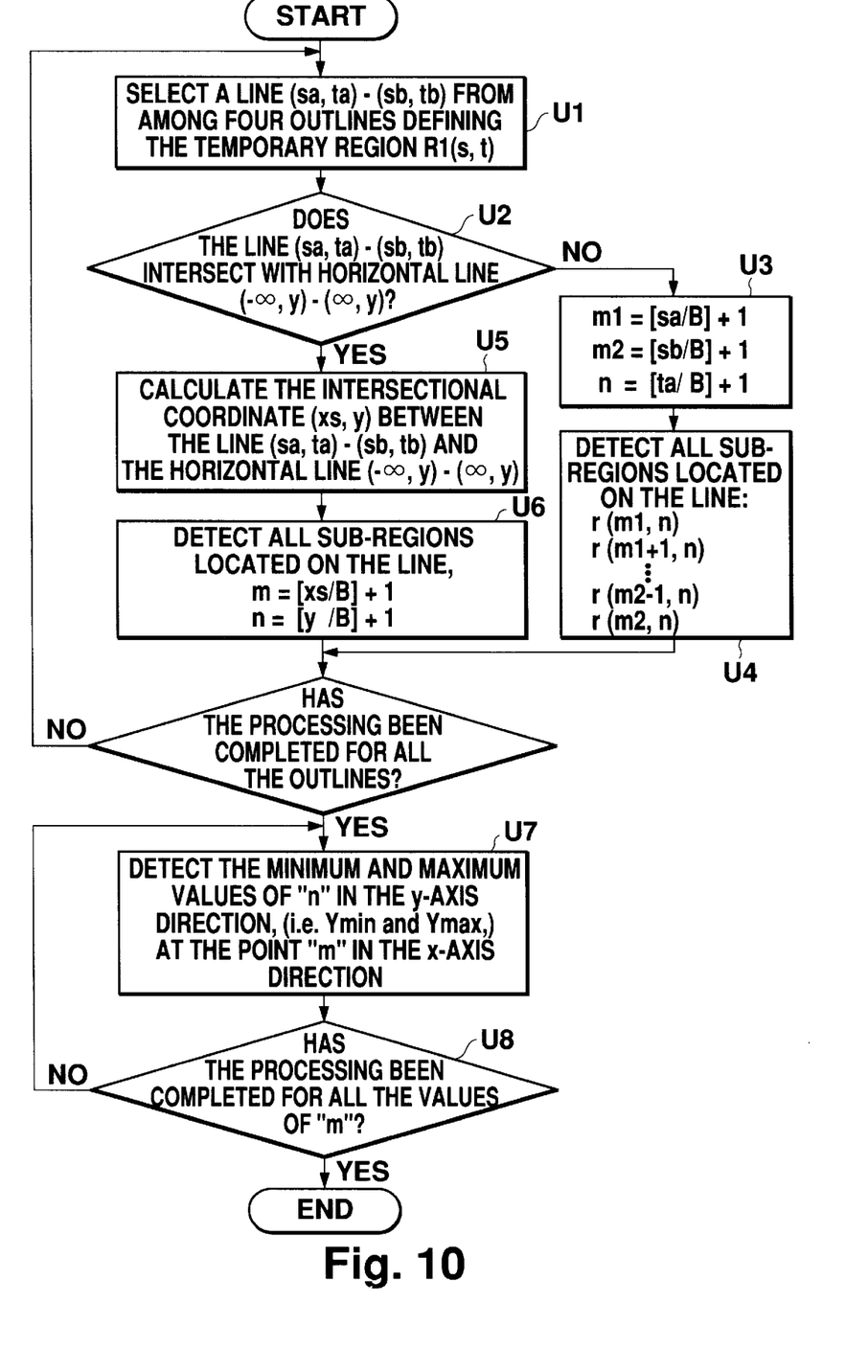
FIG. 10 is a flow chart showing a second technique for detecting sub-regions associating with a temporary region.

The second technique is shown in the flowchart of FIG. 10.

Any straight line (sa, ta)-(sb, tb) is selected from among four outlines defining the temporary region R1 (s, t) (step U1). It is detected whether or not the selected line intersects with the horizontal line (−∞, y)-(∞, y), where 0≦y≦ (number of pixels in the vertical direction of the pre-transformed image minus 1), y is an integer (step U2). If NO, it is judged that the selected line itself is a horizontal line, and the operation proceeds to step U3, where m1=[sa/B]+1, m2=[sb/B]+1, and n=[ta/B]+1 are calculated. It should be noted that only an integer portion is extracted in the bracket. Based on the calculated m1, m2 and n, sub-regions r(m1, n), r(m1+1, n), . . . , r(m2−1, n), r(m2, n), which are located on the selected line, are obtained (step U4).

If it is detected that there is an intersection with the horizontal line at step U2, the operation proceeds to step U5, and intersection coordinate (xs, V), where the horizontal line (−∞, y)-(∞, y) intersects with the selected line (sa, ta)-(sb, tb), is calculated, varying the value of the y coordinate from "ta" to "tb". On the basis of the intersection coordinate (xs, y), m=[xs/B]+1 and n=[y/B]+1 are calculated (step U6). From the calculated values of m and n, all the sub-regions r(m, n) located on the selected line (sa, ta)-(sb, tb) are detected. When it is confirmed that the abovementioned processing has been carried out for all of four lines defining the temporary region, the operation proceeds to step U7.

In step U7, based on the sub-regions r(m, n) located on the four lines, the minimum and maximum values in the y-axis direction Ymin and Ymax at the X location "m" are detected. All the sub-regions located on r(m, Ymin) to r(m, Ymax) are included in the temporary region R1(s, t). The same processing is carried out for the X-axis direction with the X location "m", the value of "m" being varied from minimum to maximum. Thus, all the sub-regions r(m, n) contained in the temporary region R1(s, t) are detected. When it is confirmed that all the sub-regions r(m, n) have been detected in step U8, the operation terminates.

The first technique has an advantage that calculation is simple and processing time is relatively short. However, in the case that the rotational angle of the temporary region R1(s, t) become large (such as a case shown in FIG. 9), the sub-regions which do not actually overlap the temporary region are also detected as associated sub-regions (e.g. four sub-regions located at the corners of the doted area in FIG. 9). As a result, errors in the processing on and after step Q5 (FIG. 4) become large.

On the other hand, the second technique can accurately detect those sub-regions overlapping the temporary region based on the detection of sub-regions located on the outlines of the temporary region R1(s, t). This technique has a drawback of taking a longer time before detecting all the sub-regions located on the outline of the temporary region.

It is preferable to select either of two techniques depending on the presence or absence of a rotational angle so as to minimize the coordinate transformation of the binary image.

Thus, the above described method is effective not only for the case of simple enlargement or reduction, but also for the case including rotation or distortion.

What is claimed is:

1. A coordinate transformation method for an original binary image comprising the steps of:

dividing the original binary image into a plurality of pre-defined sub-regions, wherein each sub-region includes a plurality of pixels of the original binary image;

detecting, for each sub-region, whether or not the sub-region consists of pixels defined by a single color value, the single color value being one of the two color values of the original binary image;

labelling each sub-region with a label value indicating the color state of that sub-region based on the detection results;

storing the label value of each sub-region;

dividing a post-transformed binary image into a plurality of sub-blocks, each of the sub-blocks including a plurality of pixels and being associated with at least one sub-region;

detecting, for each sub-block, all sub-regions which contain pixels corresponding to those pixels included in a sub-block of the post-transformed binary image; and covering an entire sub-block with a single color in one operation when all of the detected sub-regions associated with the sub-block have the same label value, indicating that all the pixels of the sub-region have the single color.

2. The method according to claim 1, wherein the number of sub-blocks of the post-transformed image is determined on the basis of a ratio of two colors occupying the original binary image.

3. The method according to claim 1, further comprising the steps of:

transforming vertex coordinates of each sub-block of the post-transformed image into the original binary image to form a temporary region defined by the transformed vertex coordinates in the original binary image; and detecting all the sub-regions overlapping the temporary region, thereby detecting all the sub-regions containing pixels corresponding to those pixels included in a sub-block of the post-transformed image.

4. The method according to claim 3, wherein the number of sub-blocks of the post-transformed image is determined on the basis of a ratio of two colors occupying the original binary image.

5. The method according to claim 3, wherein, in the case that the temporary region is rotated with respect to the sub-region of the original binary image, those sub-regions located on the outlines defining the temporary region are first detected, based on which all the sub-regions overlapping the temporary region are detected.

6. The method according to claim 5, wherein the number of sub-blocks of the post-transformed image is determined on the basis of a ratio of two colors occupying the original image.

7. The method according to claim 3, wherein, in the case that the temporary region is not rotated with respect to the sub-region of the original binary image, all the sub-regions overlapping the temporary region are directly detected based on the vertex coordinates of the temporary region.

8. The method according to claim 7, wherein the number of the sub-blocks of the post-transformed image is determined on the basis of the ratio of the two colors occupying the original binary image.

* * * * *